INVENTOR:
F. B. ROLFSON

INVENTOR
F. B. ROLFSON
BY James Todorovic
HIS ATTORNEY

United States Patent Office 3,049,907
Patented Aug. 21, 1962

3,049,907
FRACTIONAL BOILING POINT RECORDER
Francis B. Rolfson, San Pablo, Calif., assignor to Shell Oil Company, a corporation of Delaware
Filed June 27, 1958, Ser. No. 744,945
10 Claims. (Cl. 73—17)

This invention relates to a recording instrument, and more particularly pertains to an instrument which is designed to determine and record the boiling point of any particular fraction of a liquid mixture.

In the refining of petroleum products it is often necessary to determine the boiling point of a particular fraction of the distillation product to insure that the finished product will meet a required specification. This knowledge is also essential for the proper operation of a refinery since intermediate products must frequently be removed within a very narrow range of boiling points.

A recognized method for determining the boiling point of any particular fraction of a distillation product is the method which is known as American Society for Testing Materials Method D-86 titled "Test for Distillation of Petroleum Products." In this test a 100 milliliter (ml.) sample is distilled from a sidearm flask into a cooled condenser tube and collected in a graduate cylinder at the lower end of the condenser tube. A mercury thermometer whose bulb is located at the sidearm outlet of the flask indicates the vapor temperatures. A specified heating routine is set forth in the test and temperatures are observed and recorded as the first drop flows from the condenser and for each 10 ml. collected in the graduate. The first drop temperature is known as the initial boiling point and subsequent boiling points are known as certain percent recovered points.

During the test the heat rate must be maintained so that the sample is distilled at a rate of 4 to 5 ml. per minute up to approximately the 90% point. At this point the heating is held constant to determine the end point which is the maximum temperature observed on the thermometer under prescribed conditions. The time required to run on a petroleum sample by the above method is approximately one hour and requires the attendance of a qualified operator. Also, even though all variables are controlled the results obtained will still vary over a fairly wide range, thus making it difficult to reproduce the results obtained.

From the above description it can be readily appreciated that the method described has several disadvantages such as the time required to run a sample and the need for a qualified operator. Also, during the time required to run a sample the operation of the refinery can change radically thus the information obtained will not necessarily reflect the refinery operation at the conclusion of the test. In addition the use of a qualified operator results in a relatively high cost per test which increases the overall cost of operating a refinery.

Accordingly it is the principal object of this invention to provide a novel means for determining the boiling point of any particular fraction of a liquid mixture which is substantially automatic and relatively fast.

A further object of this invention is to provide a unique device which will determine the boiling point of any particular fraction of a liquid mixture, for example, the 90% boiling point which is simple to operate and requires little time.

A still further object of this invention is to provide a novel device for determining any particular boiling point of a liquid mixture in which the liquid mixture is fed to an evaporator at a constant flow rate and the heat to the evaporator controlled so that the major portion of the sample is evaporated and only a small portion recovered as a liquid. For example, if the 90% boiling point is desired 90% of the liquid mixture fed to the evaporator is evaporated and 10% of the mixture is recovered as a liquid.

A still further object of this invention is to provide a unique device for determining any particular boiling point of a liquid mixture in which a large portion of the sample is evaporated and a minor portion is recovered as a liquid. The amount recovered as a liquid is measured and used to control the heat supply to the evaporator so that the liquid portion may be accurately controlled. The temperature of the liquid portion, of course, indicates the boiling point of the major portion of the sample.

The above objects and additional advantages of this invention are achieved by providing an instrument in which a constant ratio is maintained between a portion of the mixture which is evaporated and a portion which is maintained as a liquid. In order to accomplish this, pump means discharges a constant flow of liquid to a heat exchanger surrounding an evaporator with the heat exchanger discharging the preheated liquid onto the outer surface of the evaporator. A major portion of the liquid is flashed to a vapor and removed from the outer surface of the evaporator and a minor portion is removed as a liquid from the lower end of the evaporator. The portion removed as a liquid is collected in a suitable trap which discharges the liquid in the form of discrete drops. The discrete drops pass through a counting means in order that the number of drops may be accurately counted to control the heat input to the evaporator. A thermocouple or other temperature indicating device is placed in the lower end of the evaporator so that the temperature of the liquid flowing from the lower end of the evaporator may be accurately determined.

Since the size of the drops flowing from the collecting trap will be substantially constant, by counting these drops one may determine the portion of the liquid mixture supplied to the evaporator which remains a liquid. Thus, for example, if 3% of the liquid mixture supplied to the evaporator is removed as a liquid by the trap the temperature of the liquid will indicate the 97% boiling point of the liquid mixture supplied to the device. In order to determine various boiling points one only has to change the setting of the controller which controls the heat input to the evaporator. By properly calibrating this controller the device can be used to determine any desired boiling point of a liquid sample. Likewise, if one wishes to determine the percent fraction of a liquid mixture that will boil off at a set temperature the temperature can be set and the drops counted to determine the fraction.

The above objects and other advantages of this invention may be more easily understood by those skilled in the art from the following detailed description of a preferred embodiment when taken in conjunction with the attached drawings in which.

Figure 1:
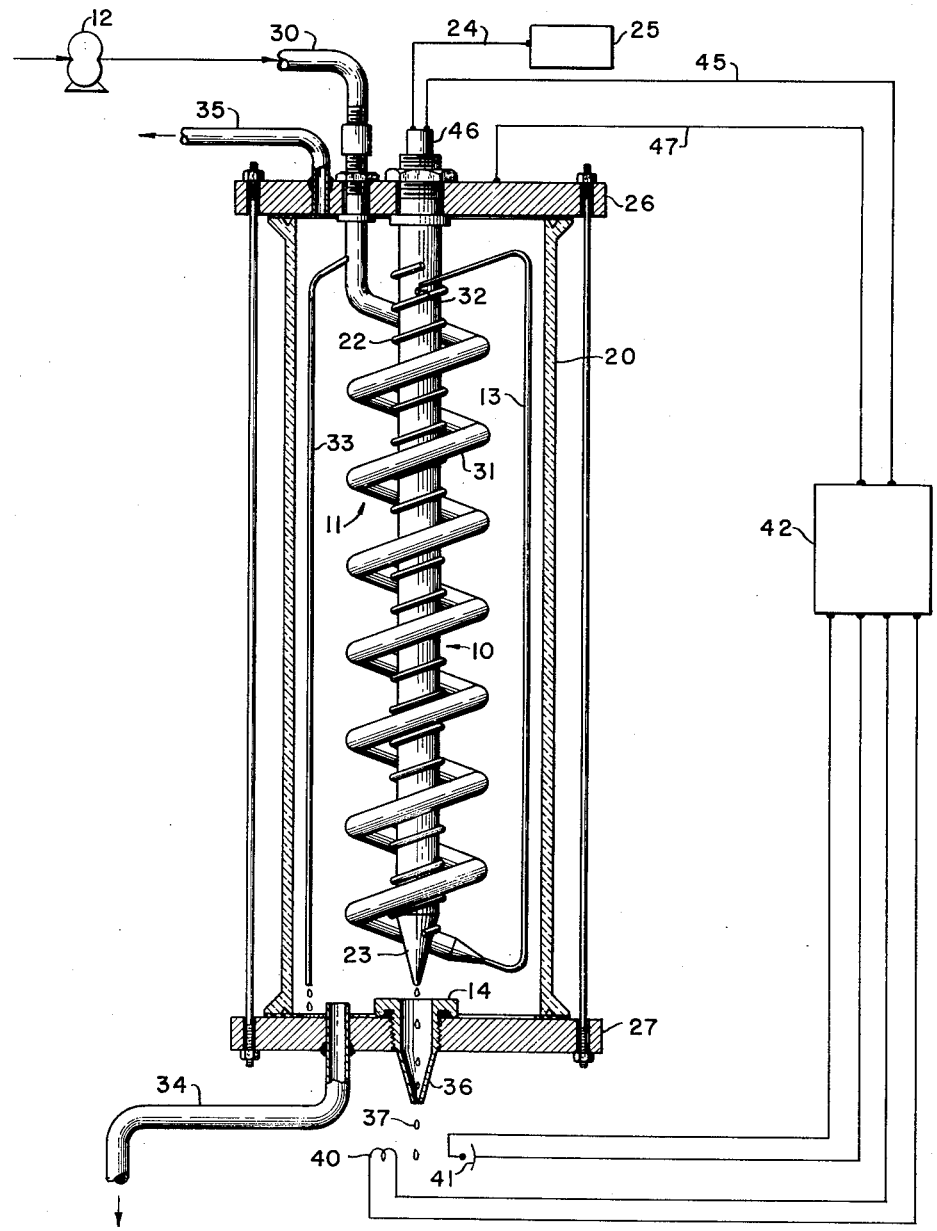
FIG. 1 is a schematic drawing of a preferred embodiment of this invention.

Referring now to FIG. 1 there is shown a flash type evaporator 10 mounted in a suitable housing 20. A metering pump 12 supplies a liquid mixture to a heat exchanger 11 which is coiled around the evaporator 10 and discharges onto the outer surface of the evaporator where a major portion of the mixture is evaporated. A small portion of the mixture drains from the lower end of the evaporator as a liquid and is collected by a trap means 14. The liquid drains from the trap in the form of discrete drops which are counted by the exciter lamp 40 and photo cell 41 with the electrical signal from the photo cell being used to control the heat input to the evaporator.

The evaporator 10 is preferably of tubular construction so that the means used for recording the temperature of the liquid as well as the means used for heating the evaporator may be placed in the interior of the tube. The evaporator 10 in addition is preferably formed from a corrosion resistant material having a relatively large resistance to the flow of electrical current such as stainless steel or the like. This tube is closed at the lower end to provide a conical shaped portion 23 from which the liquid portion of the sample will drain. A helical spring or rod 22 is secured to the outer surface of the evaporator 10 in order to properly distribute the liquid which is fed to the evaporator. The metering pump 12 can be any well known commercial pump which is capable of delivering a constant flow of liquid to the heat exchanger 11. The flow of liquid to the heat exchanger can vary over a wide range, of course, when smaller flows are utilized, a smaller evaporator may be necessary while with larger flows a larger evaporator may be necessary. The pump discharges into a conduit 30 which is connected with the heat exchanger 11 which consists of a coiled tube 31 surrounding the evaporator 10. The lower end of the heat exchanger is joined to a small diameter discharge tube 13 which terminates in an open end 32 adjacent the top of the evaporator 10. A small tubular condensate collector 33 is attached to the outer surface of the heat exchanger 11 in order to conduct the condensate which collects on the outer surface of the heat exchanger to the lower portion of the housing 20. The condensate which is collected at the lower portion of the housing is drained off through a suitable liquid trap 34 and discarded. The temperature of the liquid portion of the sample draining from the conical end 23 of the heat exchanger is determined by means of a thermocouple disposed on the interior of the evaporator and connected to a recorder 25 by means of a lead 24. The housing 20 may be formed of any desired material, a tubular glass member having end plates 26 and 27 at each end being satisfactory. A conduit member 35 is provided for venting vapor from the interior of the housing 20.

The liquid draining from the conical end 23 of the evaporator is collected by means of a trap 14 mounted in the bottom wall 27 of the housing. A conical end portion 36 is formed on the lower end of the trap and provided with a small opening so that the liquid will drain from the trap in the form of discrete drops 37. An exciter lamp 40 is positioned so that its beam will fall on the active surface of a photo cell 41 and in addition pass through the path of the drops 37. Thus, each drop 37 will interrupt the beam of light from the excited lamp and cause the photo cell to transmit an electrical pulse. In this manner, the photo cell 41 detects the drops 37 as they interrupt the beam from the lamp 40. These pulses are transmitted by suitable leads to a controller circuit 42 which utilizes the pulses to generate a signal to control the heat input to the evaporator 10. An electric heater is used in the evaporator 10 and thus the signal from the controller 42 takes the form of an electrical current which is supplied to the evaporator heater by means of leads 45 and 47. While any desired heater may be used the preferred method is to utilize the tube forming the evaporator as the heater. In order to accomplish this, a hollow tube 46 of an electrically conducting material, such as copper, is placed on the interior of the evaporator tube and connected to the extreme lower portion of the tube. Thus, if one lead 45 is connected to the tube 46 and the other lead 47 is connected to the upper end of the evaporator tube 10 the evaporator tube will function as a resistance heater due to the high electrical resistance of most stainless steel.

From the above description it can be appreciated that this invention has provided a simple means by which any particular boiling point of a liquid mixture may be accurately determined in a very short time. The metering pump 12 will supply a uniform or constant flow of liquid mixture to the evaporator 10 where a major portion of the liquid will be vaporized. A minor portion of the mixture will be removed as a liquid and collected in a trap 14. By measuring the amount of liquid collected in the trap 14, one can determine the particular fraction of the mixture being evaporated and, of course, the temperature of the liquid will be the boiling point of the particular fraction. For example, if 33⅓ ml. of liquid per minute were supplied by the pump means to the evaporator and 1 ml. of liquid per minute was removed from the lower end of the evaporator, it would mean that the boiling point of the portion of the mixture which is vaporized would correspond to the 97% fraction of the liquid mixture. The boiling point of this particular fraction of the mixture would be determined by the thermocouple which is disposed at the lower end of the evaporator 10. The use of the exciter lamp and photo cell provides a relatively simple means for accurately measuring the minor portion of the mixture which is removed from the lower end of the evaporator as a liquid since the volume of each drop is constant. For example, in one device which was constructed, 120 drops per minute corresponded to 1 ml. of liquid. Thus, if suitable means are provided for varying the effect of the controller 42, one can obtain a direct reading of any desired boiling point of a liquid mixture. While an exciter lamp and photo cell are used to count the drops, many other types of counting devices may also be used. For example, a switch could be closed as each drop falls or other devices actuated by the falling of the drops.

Figure 2:
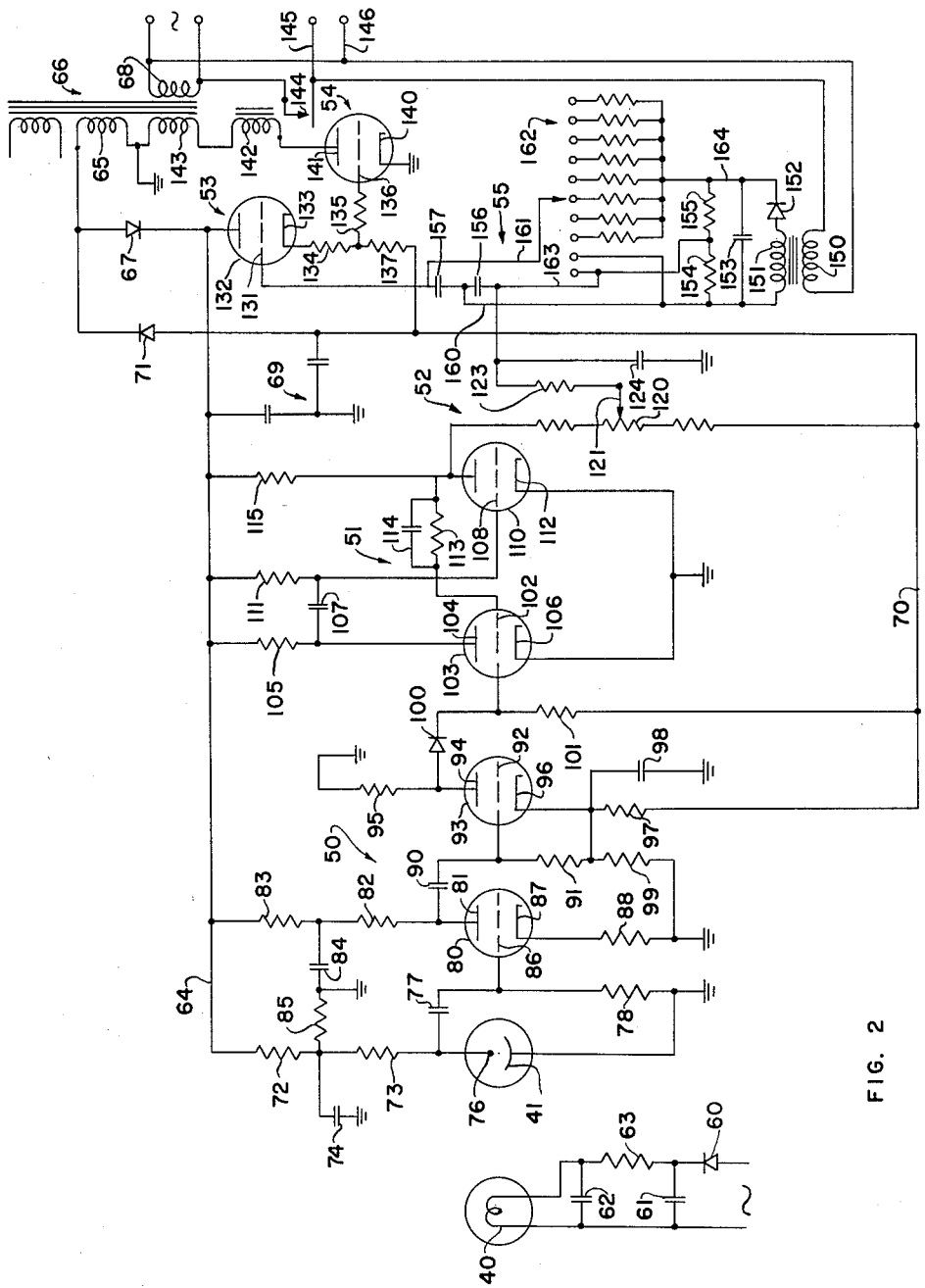
FIG. 2 is a schematic drawing of the control circuit which is used for controlling the heat supplied to the evaporator.

The particular construction details of the controller 42 are shown in FIG. 2 and described below.

The controller consists essentially of an amplifier 50 for amplifying the pulses received from the photo cell 41 and supplying them to a monostable multivibrator 51. The monostable multivibrator 51 is designed so that it supplies a square wave pulse having a predetermined duration; for example, 1/10 of a second for each input pulse. The square wave pulses supplied by the multivibrator 51 are integrated by the resistance capacitance circuit 52 and the direct current signal is used to control the operation of a thyratron tube 54. The direct current signal is coupled to the thyratron 54 through a suitable cathode follower circuit 53 in order to obtain substantially instantaneous response of the thyratron to the changes in the level of the direct current signal. The thyratron is used to control the opening and closing of relay 144 which in turn completes the circuit between leads 145 and 146 in the main power supply. The leads 145 and 146, of course, are connected to the leads 45 and 47 shown in FIG. 1. A reset circuit 55 is disposed in the cathode follower circuit in order to obtain both proportional control and a reset action from the cathode follower circuit. Thus, the controller will operate as a proportional controller with its normal droop type characteristic in response to sudden changes in the heat required by the evaporator and will reset to a substantially constant position after a point of equilibrium has been reached.

The exciter lamp 40 which may be of any well known incandescent lamp is supplied with direct current obtained from any desired source, such as a battery or rectifying the alternating current power supply by means of a rectifier 60 and a filtering circuit having capacitors 61 and 62 and resistance 63. It is necessary to operate the exciter lamp from a direct current supply in order to prevent the changes in the lamp's intensity caused by alternating current from triggering the photo cell. The positive power supply for the remainder of the circuit is obtained from a bus 64 which in turn is energized from the upper half 65 of the center taped secondary winding of the transformer 66. The primary 68 of the transformer 66 is connected to the alternating current power supply by means of suitable leads. The output from the secondary winding 65 is rectified by means of rectifying elements 67 and 71 and is filtered by means of a filtering circuit 69. The rectifying element 71 is disposed in the negative power bus 70 while the element 67 is disposed in the positive power bus.

The anode 76 of the photo cell 41 is connected to the positive power bus through a filter circuit consisting of resistor 72 and capacitor 74 and a load resistor 73, while the cathode is connected directly to ground. The signal from the anode 76 of the photo cell is coupled to the grid 86 of the triode 80 which forms the first stage of amplifier 50 by means of a capacitor 77 and a resistor 78. The plate 81 of the triode 80 is connected to the positive power bus through a load resistor 82 and an additional filter circuit having a resistor 83 and capacitor 84. The cathode of tube 80 is connected to ground through a resistor 88 while the output of the tube is connected to the grid 92 of a triode 93 forming the second stage of the amplifier 50 through a coupling capacitor 90 and a resistor 91. The grid 92 is connected to the negative power bus 70 through a voltage divider consisting of resistors 91 and 97, with a by pass capacitor 98 being used as a filter. The plate of the tube 93 is connected to ground through a resistance 95 while the cathode 96 is connected to the negative power bus 70 through a voltage dividing network. The value of the resistors 95 and 97 should be chosen to bias the tube 93 to obtain an output signal sufficient to maintain the triode 103 of multivibrator in a non-conducting condition except when triggered by a pulse from the photocell 41.

The output pulse from the triode 93 is coupled to the grid 102 of the triode 103 which forms half of the multivibrator through a rectifying element 100 and a resistance 101 which is connected to the negative power bus 70. The rectifier 100 is preferably a semi-conductor type of diode and acts as a blocking diode in order to prevent the negative pulse appearing on the plate 94 of the triode 93 from triggering the multivibrator circuit. The plate 104 of the tube 103 is connected to the positive power supply through a resistance 105 while the cathode 106 is connected directly to ground. The output of the triode 103 is connected to the grid 108 of the second triode 110 of the multivibrator through a capacitor 107 and a resistance 111 which is connected to the positive power bus. The plate of the tube 110 is connected to the positive power supply through a resistance 115 while the cathode is connected directly to ground. The plate of the tube 110 is also connected to the grid of the tube 103 through a parallel capacitance resistance network having a capacitor 114 and resistance 113. The time constant of the capacitance resistance network 107—111 should be chosen so that the positive pulse appearing on the plate of the tube 110 has the desired duration.

From the above description it will be appreciated by those skilled in the art that each drop falling from the trap 14 will cause the photo cell 41 to generate a positive pulse. This pulse will be amplified by the amplifier 50 and supplied to the multivibrator 51 in the form of a sharp positive pulse having a relatively short duration. This pulse will cause the multivibrator 51 to trigger thus causing the tube 103 to conduct. The tube 103 will conduct until the capacitor 107 is charged at which time the capacitor will cut off the tube 103 and return the multivibrator to its quiescent condition in which tube 110 will be conducting as is well known to those skilled in the art. The duration of the pulse supplied by the multivibrator can be controlled by changing the time constant of the resistance and capacitance circuit between the plate of tube 103 and grid of tube 110.

The output from the tube 110 is connected to a potentiometer 120 which in turn is connected to the negative power bus 70. The slider 121 of the potentiometer is connected to the integrating circuit formed by the resistance 123 and capacitor 124 which will sum the positive pulses appearing at the plate of the tube 110 and supply a direct current signal of proper magnitude to the cathode follower circuit. The time constant of this integrating circuit which is on the order of 10 seconds can be easily changed by adjusting the value of the resistance 123 and capacitor 124. The set point of the controller is adjusted by means of the slider 121 which changes the level of the pulses supplied to the integrating circuit. The term set point is used to designate the drop rate from the trap 14 which the controller will maintain. The drop rate of course is inversely proportional to the boiling point thus if the potentiometer 120 is properly calibrated any desired boiling point may be determined by adjusting the potentiometer. The direct current signal from the integrating circuit 52 is connected to the cathode follower stage 53 through the reset and proportional control 55. The reset circuit 55 and its operation will be described below.

The cathode follower circuit 53 is formed by the tube 132 whose plate is connected directly to the positive supply while the cathode 133 is connected to the grid 136 of the thyratron 54 through series connected resistors 134 and 135. The common connection between the resistors 134 and 135 is connected to the negative power bus 70 through a resistance 137. The cathode 140 of the thyratron is connected directly to ground while the plate 141 is connected through the relay coil 142 to the other half 143 of the split secondary of the transformer 66. Thus whenever the thyratron 54 fires it will close the relay contact 144 and supply electric power to the leads 145 and 146 which are connected to the heating element of the evaporator shown in FIGURE 1.

The closing of the relay contact 144 also supplies power to the primary 150 of a transformer whose secondary 151 is connected to the reset circuit 55. The output of the secondary 151 of the transformer is rectified by means of rectifying element 152 with output being filtered by means of the capacitor 153 and resistor 154. The reset circuit consists of two capacitors 156 and 157 which are disposed so as to be charged in opposition to each other and a fixed resistance 155 and a variable resistance 162. The common connection between the two capacitors 156 and 157 is connected to the negative side of the secondary 151 by means of a lead 160 while the positive side of the capacitor 156 is connected to the positive side of the secondary 151 through a fixed resistance 155. The positive side of the capacitor 157 is connected to the positive side of the secondary 151 through the variable resistance 162.

From the above description of the reset circuit it will be appreciated that when the contact 144 of the relay closes the two capacitors 156 and 157 will commence to charge. In designing the circuit the time constant of the capacitor 157 and variable resistance 162 should be maintained much larger than the time constant of the capacitor 156 and resistance 155. Thus the capacitor 156 will reach a substantially charged state before the capacitor 157 is fully charged and accordingly when the capacitor 156 discharges it will tend to drive the grid 131 negative which will cause the tube 132 to cease conducting. This will extinguish the thyratron 54 thus allowing the relay contact to open. Of course, when the relay contact opens the capacitor 156 will completely discharge while capacitor 157 will be partially discharged due to the much larger time constant of the capacitor 157. This will result in a small residual charge being retained by the capacitor 157 so that when the contacts are next closed and the capacitors are charged, the capacitor 157 will be charged to a higher potential. Thus while the initial change in the heat requirement of the evaporator will cause the controller to cycle the heater between an on and off position as is customary with a proportional control, the controller will quickly establish a duty cycle which will be sufficient to maintain the desired temperature. This result is obtained because of the difference in the time constant of two capacitors and their associated resistors. As explained above, the large time constant of the capacitor 157 and its associated resistor tend to drive the cathode follower triode towards a constant output while the capacitor 156 tends to drive the circuit to an on and off cycling type of operation.

From the above description of a preferred embodiment of this invention it can easily be seen that a simple device has been provided by which the boiling point of any particular fraction of a particular mixture may be readily determined with a minimum of effort. By providing a suitable percentage calibrations on the potentiometer 129 the boiling point can be read directly while the temperature of the boiling point can be determined from the recorder 25 connected to the thermocouple.

While this invention has been described using an electronic control means and an electrical heater for the evaporator other systems could also be used. For example, the drops 37 could be used to trigger a pneumatic system which in turn could control a source of heat such as steam or other heated fluids. Thus while one particular embodiment of this invention has been described in detail, it should not be limited to this particular construction as it is susceptible to many modifications and changes.

I claim as my invention:

1. A device for determining the boiling point of any fraction of a liquid mixture comprising: evaporator means; feed means for supplying a constant flow of the liquid mixture to the evaporator means; heating means for said evaporator means; control means for said heating means to control said heating means so that only the portion of said liquid mixture containing the fraction is evaporated and temperature measuring means for determining the temperature of the remaining liquid portion of the mixture.

2. A device for determining the boiling point of any fraction of a liquid mixture comprising: a closed end tube, said tube being mounted in a substantially vertical position with its closed end extending downward; flow distributing means mounted adjacent the top of said tube; a heat exchanger surrounding said tube and having one end discharging adjacent said flow distributing means; pump means for supplying a constant flow of the liquid to the other end of said heat exchanger; heating means disposed in said tube; liquid collecting means disposed adjacent the closed end of said tube for collecting the unevaporated portion of the liquid supplied by said pump means, an opening in said collecting means to permit said collected liquid to drain out; a source of light disposed to pass a light beam through the liquid draining from said collecting means; light sensitive means disposed to intercept the beam of light after it passes through the liquid and supply an electrical signal proportional to the flow of liquid, said electrical signal being used to control the heat supplied by said heating means; and means for determining the temperature of the closed end of said tube.

3. A device for determining the boiling point of any fraction of a liquid mixture comprising: evaporator means including electrical heating means; feed means for supplying a constant flow of liquid to said evaporator means; a portion of the liquid supplied being removed from said evaporator means as a liquid and collected in a trap; control means for controlling the portion of said liquid removed, said control means being disposed to measure the liquid flow from the trap and control the heating means in proportion to the flow and temperature sensing means for determining the temperature of the portion of the liquid removed.

4. A device for determining the boiling point of any fraction of a liquid mixture comprising: evaporator means including electrical heating means; feed means for supplying a constant flow of liquid to said evaporator means; a portion of the liquid supplied being removed from said evaporator means as a liquid and collected in a trap; control means for controlling the portion of said liquid removed, said control means comprising a light source and a light sensitive detector disposed so that said light source passes through the flow from said trap, said light sensitive detector supplying an electrical signal proportional to the flow from said trap, said electrical signal in turn being used to control said heating means and temperature sensing means for determining the temperature of the portion of the liquid removed.

5. A device for determining the boiling point of any fraction of a liquid mixture comprising: evaporator means including electrical heating means; feed means for supplying a constant flow of liquid to said evaporator means; a portion of the liquid supplied being removed from said evaporator means as a liquid and collected in a trap, said trap having an outlet disposed to drain the collected liquid from said trap in discrete drops; detecting means disposed to detect said drops and supply an electrical pulse for each drop and circuit means responsive to said electrical pulses for controlling said heating means and temperature sensing means for determining the temperature of the portion of the liquid removed.

6. A device for determining the boiling point of any fraction of a liquid mixture comprising: evaporator means including electrical heating means; feed means for supplying a constant flow of liquid to said evaporator means; a portion of the liquid supplied being removed from said evaporator means as a liquid and collected in a trap, said trap having an outlet disposed to drain the collected liquid from said trap in discrete drops; detecting means disposed to detect said drops and supply an electrical pulse for each drop; circuit means including a gas discharge tube responsive to said electrical pulses for controlling the electrical current supplied to said heating means and temperature sensing means for determining the temperature of the portion of the liquid removed.

7. A device for determining the boiling point of any fraction of a liquid mixture comprising: evaporator means; heating means for said evaporator means to raise the temperature thereof to a point where a liquid mixture supplied thereto is separated into evaporated and non-evaporated portions; control means for said heating means; feed means for supplying a flow of the liquid mixture to said evaporator means and means responsive to the non-evaporated portion of the liquid mixture for actuating said control means to maintain a constant ratio between the evaporated and non-evaporated portions of the liquid mixture, and temperature sensing means for determining the temperature of the non-evaporated portion.

8. A device for determining the boiling point of any fraction of a liquid mixture comprising: evaporator means including a heating means; feed means for supplying a flow of the liquid mixture to said evaporator means; a portion of the liquid supplied to the evaporator means being removed from the evaporator means as a liquid; control means responsive to the quantity of the liquid mixture removed from the evaporator means as a liquid for controlling the heating means of said evaporator means and temperature sensing means for determining the temperature of the portion of the liquid removed.

9. A device for determining the boiling point of any fraction of a liquid mixture comprising: evaporator means including a heating means; feed means for supplying a flow of the liquid mixture to said evaporator means; a portion of the liquid supplied to the evaporator means being removed from the evaporator means as a liquid; signal means responsive to the portion removed as a liquid for generating a signal proportional to the quantity removed as a liquid; and control means responsive to said signal for controlling the heating means of said evaporator means and temperature sensing means for determining the temperature of the portion of the liquid removed.

10. A device for determining the boiling point of any fraction of a liquid mixture comprising: evaporator means including a heating means; feed means for supplying a flow of the liquid mixture to said evaporator means; a portion of the liquid supplied to the evaporator means being removed from the evaporator means as a liquid the portion of the mixture removed as a liquid being collected in a trap means, said trap means having an opening disposed to drain said liquid from said trap in the form of discrete drops; signal means for generating an electrical pulse for each drop; said electrical pulse being coupled to a monostable multivibrator circuit; an integrating circuit coupled to said multivibrator circuit for integrating the pulses of said multivibrator circuit to supply a direct current signal proportional to said pulses; a control means responsive to said direct current signal for controlling the heating means of said evaporator means and temperature sensing means for determining the temperature of the portion of the liquid removed.

References Cited in the file of this patent

UNITED STATES PATENTS

| | | |
|---|---|---|
| 2,350,006 | Wolfner | May 30, 1944 |
| 2,594,683 | Rolfson | Apr. 29, 1952 |
| 2,639,609 | Shands | May 26, 1953 |
| 2,688,866 | Horner | Sept. 14, 1954 |
| 2,838,643 | Elliot et al. | June 10, 1958 |
| 2,876,327 | Leisey | Mar. 3, 1959 |
| 2,967,422 | Kapff et al. | Jan. 10, 1961 |